Patented Aug. 7, 1951

2,562,965

UNITED STATES PATENT OFFICE 2,562,965

EMULSION POLYMERIZATION OF LONG-CHAIN VINYL ESTERS

Daniel Swern, Edmund F. Jordan, Jr., and William S. Port, Philadelphia, Pa., assignors to the United States of America as represented by the Secretary of Agriculture No Drawing. Application June 20, 1950, Serial No. 169,282

2 Claims. (Cl. 260—407)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to an improved method of polymerizing monomeric materials comprising a vinyl ester of a higher fatty acid.

Vinyl esters of fatty acids containing six or more carbon atoms are monomers which can be readily produced in good yield from inexpensive and abundant raw materials. When these vinyl esters are heated in an oxygen-free atmosphere, to about 75°–100° C., in the presence of a suitable free-radical producing catalyst, an extremely rapid exothermic polymerization reaction sets in which is virtually impossible to control. The reaction can be modulated by the addition of an inert solvent, but this polymerization technique has many disadvantages, due primarily to the difficulty in selecting a solvent which is actually inert in the process and separating the solvent from the polymeric products. Ready dissipation of the heat evolved in a polymerization reaction can be attained by conducting the process in aqueous emulsion, thus increasing the surface of the polymerizable phase by dispersing it in a relatively large amount of water. Vinyl esters of fatty acids containing six or more carbon atoms, however, are difficult to emulsify by means of the dispersing agents commonly utilized in emulsion polymerizations, such as soaps, alkyl aryl sulfonates and the like, the use of which results not only in an inadequate emulsification of the monomeric materials in the aqueous medium, but also has a detrimental effect upon the rate and completeness of the polymerization reaction.

We have found that vinyl esters of fatty acids containing at least six carbon atoms can be readily emulsified by utilizing as the dispersant a non-ionic surface active agent in combination with an ionic surface active compound. We have further found that the conjoint use of ionic and non-ionic emulsifiers in the emulsion polymerization of vinyl esters of higher fatty acids not only produces stable emulsions but also reduces foaming during emulsification.

The non-ionic emulsifying agents best adapted for use in our process are the long chain aliphatic monocarboxylic acid esters of anhydrosorbitols such as the monolaurate, monooleate and tetrastearate, and the esters of anhydromannitols such as the palmitate and laurate of which the mixed monolaurates of anhydrosorbitols are the most efficacious. These non-ionic compounds can be used in conjunction with one or several anionic emulsifiers, preferably with sulfated aliphatic alcohols such as 3,9-diethyl-6-tridecanol and 7-ethyl-2-methyl-4-undecanol, best results being obtained on using the sodium sulfate of 7-ethyl-2-methyl-4-undecanol.

In accordance with the method of this invention, the monomeric material comprising a vinyl ester of a monocarboxylic acid containing at least six carbon atoms, and which may also contain other polymerizable components is dispersed in an aqueous solution containing a sufficient amount of the ionic and non-ionic emulsifier, preferably from 0.3 to 1.6 percent of the former and from 0.3 to 1.6 percent of the latter (1 to 5% of monomer). The resulting emulsion is heated in an oxygen-free atmosphere and in the presence of polymerization catalyst, at a temperature not substantially in excess of 100° C. and preferably, within the range of 55° to 85° C. for a length of time sufficient to cause polymerization of the monomeric material, after which the formed polymer is recovered by any suitable procedure, such as coagulation and extraction or filtration.

In general our process is applicable to the polymerization in aqueous emulsion of vinyl esters of organic acids having six or more carbon atoms. Although the use of vinyl esters of fatty acids such as caproic, ethylbutyric and other isocaproic acids, caprylic, pelargonic, capric, lauric, myristic, palmitic, or stearic acid is preferred in view of the superior products resulting therefrom, vinyl esters of long chain acids from petroleum oxidation, of benzoic acid, as well as of the derivatives of these acids free from inhibiting substituents such as amino or nitro groups can also be used.

The polymerization reaction can be conducted in the presence of free-radical producing catalysts such as inorganic or organic per compounds like benzoyl peroxide, cumene hydroperoxide, ammonium persulfate, potassium persulfate, and other substances commonly utilized as catalysts or initiators in the production of high polymers. The technique of redox emulsion polymerization can also be employed and the polymerization can be conducted in the presence of chain-transfer agents such as carbon tetrachloride, ethylbenzene, or aliphatic mercaptans. The following Examples I through XI are given as illustrative embodiments of a manner in which our invention may be carried out in practice.

Example I

A mixture of 50 grams of vinyl palmitate, 1.5 grams of a 50 percent aqueous paste of the sodium sulfate of 7-ethyl-2-methyl-4-undecanol and 0.75 grams of sorbitan monolaurate was heated to about 40° C., stirred in a high-speed blendor in an oxygen-free atmosphere and 100 ml. of oxygen-free water was slowly added, after which stirring was continued for 10 minutes. The resulting emulsion on microscopic examination, was found to consist of small droplets of uniform size, over 90 percent of which had a diameter of less than 1 micron.

To 6 grams of this emulsion, (containing 2 g. of monomer), 0.005 grams of benzoyl peroxide was added, and the mixture was stirred and heated at 80° C. for 7 hours. The emulsion was coagulated by pouring into 20 ml. of a saturated sodium chloride solution. The oil which separated became a granular solid on cooling to 0° C. The polymer so obtained after being washed with 200 cc. of cold water and dried was recovered in substantially quantitative yield by filtration and drying. In this and all the examples given hereinafter the emulsification and polymerization were conducted in an oxygen-free atmosphere by flushing the apparatus used with nitrogen prior to and during the operations.

Example II

The procedure of Example I was repeated but the polymerization was conducted at 100° C., for 4 hours. The yield of polymer was 1.6 grams with an iodine number of 3.3.

Example III

The procedure of Example I was repeated using 0.010 grams ammonium persulfate instead of benzoyl peroxide as the polymerization catalyst and heating for 1 hour at 100° C. The yield of polymer was 2.0 grams with an iodine number of 7.9.

Example IV

The procedure of Example III was repeated but the polymerization was effected by heating at 82° C. for 1 hour. The yield of polymer was 2.0 grams with an iodine number of 6.0.

Example V

Following the procedure of Example I an emulsion was prepared from 25.0 grams of vinyl laurate, 0.75 grams of 50 percent aqueous paste of sodium sulfate of 7-ethyl-2-methyl-4-undecanol, 0.38 grams of sorbitan monolaurate and 50 ml. of water. Six grams of this emulsion and 0.005 gram of ammonium persulfate were heated at 90° C. for 1 hour. The emulsion was coagulated with saturated sodium chloride solution, the polymer was extracted with petroleum ether, the emulsifiers washed out with water and the polymer solution dried. On removal of the solvent 1.7 grams of polymer, having an iodine number of 8.99 was obtained.

Example VI

An emulsion was prepared as described in Example I from 34 grams of vinyl caprylate, 113 grams of water, 5.7 grams of the sodium sulfate of 7-ethyl-2-methyl-4-undecanol (50% aqueous paste) and 2.8 grams of sorbitan monolaurate. To the homogeneous emulsion so obtained was added 0.27 gram of potassium persulfate and the mixture heated at 55° C., with agitation for 7 hours. The polymer was precipitated by pouring the emulsion into 300 cc. of saturated salt solution, dissolved in benzene, and freed from the small amount of residual monomer by precipitation in methanol. The yield was 96.3 percent of the theoretical, and the molecular weight of the polymer was 658,000 as determined by light-scattering.

Example VII

To an emulsion prepared as described in Example I from 16 grams of vinyl laurate, 1 gram of 50 percent aqueous paste of the sodium sulfate of 7-ethyl-2-methyl-4-undecanol, 0.5 gram of sorbitan monolaurate and 40 grams of water, was added 0.10 grams potassium persulfate and the mixture heated with agitation at 55° C. for 7 hours. The emulsion was coagulated in 120 cc. of saturated salt solution and the polymer recovered as described in Example VI. The yield was 92.7% and the molecular weight of the polymer 310,000.

Example VIII

To an emulsion prepared as described in Example I from 25 grams of vinyl palmitate, 2.5 grams of 50 percent aqueous paste of the sodium sulfate of 7-ethyl-2-methyl-4-undecanol, 1.25 grams of sorbitan monolaurate and 50 grams of water, 0.125 grams of potassium persulfate was added and the mixture was heated with agitation at 55° C. for 7 hours. The emulsion was coagulated in 150 ml. saturated salt solution and the polymer was recovered as described in the foregoing examples. The yield was 79.7% and the molecular weight of the polymer 286,000.

Example IX

To an emulsion prepared as described in Example I from 20 grams vinyl palmitate, 1 gram 50 percent aqueous paste of the sodium sulfate of 7-ethyl-2-methyl-4-undecanol, 0.5 grams sorbitan monolaurate and 40 grams of water, 0.025 grams of potassium persulfate was added and the mixture heated with agitation at 55° C. for 7 hours. The polymer was recovered as described in the foregoing example. The yield was 90.3%.

Example X

The procedure of the foregoing example was repeated using 0.25 grams of 50 percent aqueous paste of the sodium sulfate of 7-ethyl-2-methyl-4-undecanol and 0.125 gram of sorbitan monolaurate. The conversion to polymer was 91.8%.

Example XI

An emulsion was prepared as described in Example I from 20 grams of vinyl palmitate, 2 grams of 50 percent aqueous paste of the sodium sulfate of 7-ethyl-2-methyl-4-undecanol, 1 gram of sorbitan monolaurate and 40 grams of a buffer solution made in the proportions of 5 ml. of 1M $H_3BO_3$ to 9 ml. of 0.1M NaOH. To 15 grams of this emulsion was added 0.025 gram potassium persulfate, and the polymerization conducted at 75° C. for 7 hours. The conversion to polymer, which was isolated as described in the foregoing examples was 90% and its molecular weight 328,000.

The following examples illustrate the results obtained on conducting the polymerization of vinyl esters of higher fatty acids in aqueous emulsions containing only one emulsifying agent.

Example XII

The procedure described in Example XI was repeated 55° C. using 1.58 grams of sodium laurate as the emulsifier in lieu of the two emulsifying agents of Example XI. The conversion to polymer was only 12 per cent.

*Example XIII*

An emulsion was prepared from 16 grams vinyl laurate, 1 gram of sorbitan monolaurate and 40 ml. of water. The emulsion was unstable and separated into two distinct layers during the attempted polymerization of the monomer at 55° C.

*Example XIV*

An emulsion was prepared as described in Example XIII using 2 grams of 50 percent aqueous paste of the sodium sulfate of 7-ethyl-2-methyl-4-undecanol in lieu of the sorbitan monolaurate. The emulsion foamed very badly during its formation. When 14 grams of this emulsion was polymerized with 0.025 grams of potassium persulfate as the initiator at 55° C. for 7 hours the conversion to polymer was 83 percent.

We claim:

1. The process which comprises forming an emulsion by dispersing a vinyl ester of a fatty acid containing from 6 to 18 carbon atoms in an aqueous medium which contains as emulsifying agents an anhydrosorbitol ester of a fatty acid containing from 6 to 18 carbon atoms and an alkali salt of a sulfated aliphatic alcohol containing at least 10 carbon atoms, and effecting the polymerization of the vinyl ester by heating the emulsion in the presence of a free-radical producing catalyst at a temperature not substantially in excess of 100° C.

2. A process which comprises forming an emulsion of a vinyl ester of a saturated aliphatic monocarboxylic acid containing from 6 to 18 carbon atoms, by dispersing said ester in an aqueous medium containing from 0.3 to 1.6 percent of sorbitan monolaurate and from 0.3 to 1.6 percent of sodium sulfate of 7-ethyl-2-methyl-4-undecanol (1–5% based on monomer) and heating the emulsion in the presence of a polymerization catalyst, at a temperature not substantially in excess of 100° C. for a length of time sufficient to cause polymerization of the vinyl ester.

DANIEL SWERN.
EDMUND F. JORDAN, JR.
WILLIAM S. PORT.

No references cited.